United States Patent Office 3,639,621
Patented Feb. 1, 1972

---

3,639,621
METHOD OF IMPROVING FEED UTILIZATION IN RUMINANTS
Roger C. Parish, King of Prussia, and John E. Trei, Malvern, Pa., assignors to Smith Kline & French Laboratories, Philadelphia, Pa.
No Drawing. Filed July 29, 1969, Ser. No. 845,919
Int. Cl. A23k 1/00
U.S. Cl. 424—304
4 Claims

ABSTRACT OF THE DISCLOSURE

Haloalkanoic acids, amides, or nitriles are administered, preferably with animal feeds, to ruminants to improve feed utilization. They inhibit methanogenesis without adversely affecting total fermentation.

---

This invention relates to methods of improving feed utilization in ruminant animals. In particular, the invention relates to methods of improving feed utilization in ruminants by administering to said animals a compound of the formula $$X_3CAlkY \qquad (I)$$

where each X group is hydrogen, alkyl of 1–4 carbon atoms, chloro, bromo, or iodo, at least one of said X groups being chloro, bromo, or iodo;
Alk is an optional straight or branched chain alkylene group of 1 to 6 carbon atoms;
Y is COOR, $CONR_2^1$, or CN;
R is hydrogen, an alkali or alkaline earth metal, or a lower alkyl group of 1 to 4 carbon atoms; and
$R^1$ is hydrogen or a lower alkyl group of 1 to 4 carbon atoms.

In the above formula, Alk may be, but is not limited to methylene, ethylene, propylene, butylene, pentylene, hexylene, 2,2-dimethylpropylene, methylmethylene

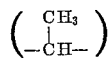

dimethylmethylene

or 2,2-dimethylbutylene. The alkyl groups within the scope of R and $R^1$ may be methyl, ethyl, propyl, butyl, isopropyl, isobutyl, or t-butyl. Alkali metals include sodium and potassium; alkaline earth metals include calcium and magnesium.

This invention also relates to animal feeds containing these compounds which are useful for improving feed utilization and promoting production in ruminant animals.

It is known that microorganisms within the rumen metabolize carbon compounds to volatile fatty acids. The most important steam-volatile fatty acids formed are acetic, propionic, and butyric acids. Lesser amounts of valeric, isovaleric, pyruvic, succinic, lactic, and formic acids are formed. The volatile fatty acids are absorbed from the intestinal system and are useful metabolites.

These fatty acids are produced in the rumen with differing efficiencies of energy conservation and are utilized by the animal tissue with differing efficiencies.

The microorganisms also produce gases during their metabolic activity. The predominant gas normally formed is carbon dioxide. Methane is also a product of ruminant metabolism. It is eliminated chiefly by eructation and is lost from the animal. It is estimated that ruminants lose about 6–15% of their total food energy in mathane losses, depending on the type of ration fed.

Recently, Prins and Seekles, J. Dairy Sci. 51, 882–87 (1968), showed that chloral hydrate and its microbial degradation products, trichloroethanol and chloroform, influence the products of fermentation of rumen flora in vitro as well as in normal cows. Although they did not measure methane production, decreased levels could be inferred from the increased levels of propionate and lactate.

The above-mentioned compounds disclosed as having potentially useful effects upon fermentation are, in fact, not useful in husbandry practice. They have deleterious effects upon total fermentation at the levels administered, are toxic to the animals, or are not suitable for preparation into practical dosage forms.

According to the present invention, we have discovered that halogenated organic compounds of Formula I significantly reduce methane production, but do so without an undesirable reduction in the overall fermentation level in the rumen. The result is that feed utilization is improved.

A preferred group of compounds effective for this purpose is represented by Formula I, when each X group is either hydrogen or chloro and Y is COOH. Among these compounds are chloroacetic acid, dichloroacetic acid, and trichloroacetic acid.

Another preferred group is represented by Formula I, when each X group is either hydrogen or chloro and Y is $CONR_2^1$. Among these compounds are 2-chloroacetamide; 2,2 - dichloroacetamide; 2,2,2 - trichloroacetamide; and 2,2,2-trichloro-N,N-dimethylacetamide.

Other compounds within the scope of Formula I which are of interest are 3-bromopropionic acid, ethyl 2-bromopropionate, 3-bromobutyric acid, 3-bromopropionamide, tribromoacetic acid, dibromoacetic acid, 2,2,2-tribromoacetamide, 2,2-dibromoacetamide, 3-chloropropionitrile, 3-bromopropionitrile, sodium trichloroacetate, and the sodium salts of the other acids named above.

The ability of compounds of Formula I to improve feed utilization in ruminants is evaluated by means of a test which measures in vitro gas production as an indicator of the rate of fermentation of feedstuffs by microorganisms of the rumen. Rumen fluid is obtained from a fistulated animal and is filtered through six layers of cheesecloth. The fluid (75 ml.) is then added to 2.4 g. of experimental ration as substrate. Test compound is then added and the mixture is incubated for 3 hours. Test compound may be added as such or, particularly when used in quantities as small as 10 p.p.m. or less, suspended or dissolved in a solvent such as water or ethanol. At the end of the test period, the trapped gases are collected by hypodermic needle from the flask and run through a gas partitioner (column chromatography) which separates and quantitates the components. The liquids (volatile fatty acids, etc.) are analyzed by gas liquid chromatography. Among the products measured are carbon dioxide, methane, and fatty acids having from 2 to 6 carbon atoms. Reduction in the percent methane produced of 20% is considered significant. However, with compounds used in the present invention, reduction of 90–100% is not uncommon. Ability of a particular compound to reduce the amount of methane generated without adversely reducing the overall rate of fermentation is determined by comparing the total ($\mu$moles/ml.) volatile fatty acids produced in control systems with those containing test compound. We have found that one can use 20–100 times the concentration of compound which is effective in inhibiting methanogenesis before the fermentation rate is significantly affected. Also significant is the distribution of fatty acids obtained.

The effect of compounds of Formula I in reducing methane production without causing a significant reduction in the rate of overall fermentation at effective concentrations, when tested by the above procedures, is shown by the data in Tables I and II, below.

The extent of the reduction in the amount of methane produced is readily apparent from the data in Table I. Inspection of Table II reveals that this inhibition of methanogenesis is achieved without significantly affecting the overall fermentation rate or the distribution of fatty acids resulting from fermentation.

TABLE I

| Compound | Percent reduction of $CH_4$ production | Effective level (p.p.m., volume basis) |
|---|---|---|
| $ClCH_2COOH$ | 90 | 60 |
| $Cl_2CHCOOH$ | 80–90 | 75 |
| $Cl_3CCOOH$ | 55 | 180 |
| $ClCH_2CONH_2$ | 90 | 120 |
| $Cl_2CHCONH_2$ | 100 | 15 |
| $Cl_3CCONH_2$ | 95–100 | 9 |
| $Cl_3CCON(CH_3)_2$ | 90–100 | 12 |
| $BrCH_2CH_2COOH$ | 95 | 18 |
| $ICH_2CH_2COOH$ | 95 | 24 |
| $ClCH_2CH_2CN$ | 80 | 55 |
| Control | None | |

TABLE II.—DISTRIBUTION OF VOLATILE FATTY ACIDS PRODUCED BY COMPOUNDS OF TABLE I

| | Molar percent | |
|---|---|---|
| | Controls | Treated |
| $C_2$ fatty acids | 54–57 | 50–52 |
| $C_3$ fatty acids | 21–23 | 25–28 |
| $C_4$ fatty acids | 15–18 | 19–22 |
| $C_5$ or higher fatty acids | (¹) | (¹) |
| Total μmoles/ml | 68–72 | 67–74 |

¹ Remainder to 100%.

In vivo experiments confirm the lack of reduction in the overall rate of fermentation. When 120 mg. of 2,2,2-trichloroacetamide in 1.2 kg. of a typical ruminant ration per day was administered to animals, the molar amounts of volatile fatty acids noted in Table III were obtained.

TABLE III

| | Molar percent | |
|---|---|---|
| | Controls | Treated |
| $C_2$ fatty acids | 46 | 38 |
| $C_3$ fatty acids | 29 | 42 |
| $C_4$ fatty acids | 17 | 19 |
| $C_5$ or higher fatty acids | (¹) | (¹) |
| Total μmoles/ml | 57.0 | 56.5 |

¹ Remainder to 100%.

It is apparent that the total fermentation rate is not affected and the distribution of the fatty acids produced is favorably influenced in the direct of higher amounts of propionate.

Compounds of Formula I are used for improving feed utilization in ruminants by combining them with suitable carriers or vehicles and particularly by incorporating them into animal feeds. The feeds are prepared conventionally and may contain any of the usual components normally found in ruminant feeds. The amount of the methanogenesis inhibitor in the feed will generally be in the range of 0.01–25%, but will vary according to the particular circumstances involved.

The compounds may also be incorporated into a carrier to form premixes or concentrates, which themselves can be incorporated into feeds. Illustrative of the carriers which may be used are soybean meal, corn oil, ground corn, barley, wheat, mineral mixtures, diatomaceous earth, corn gluten meal, corn distillers solubles, or soyflour. The active compound will be present in an amount sufficient to give the desired concentration in the ultimate feed. The animal feeds will generally contain about 5 lb. of premix per ton of feed.

The animal feeds themselves may also contain cellulosic roughage such as cellulose, haw, straw, corn stalks, oats, barley, and cereal brans; natural oils such as animal fats, fish oils, and whale oil; vegetable oils such as soybean oil, olive oil, safflower oil, peanut oil, and cotton-seed oil; antioxidants; minerals; vitamins; antibiotics; anthelmintics; and other appropriate medicaments.

An example of a suitable animal feed is as follows:

Mixed hay—40.0%
Ground yellow corn—45.0%
Soybean oil meal—7.0%
Cane molasses—7.0%
Dicalcium phosphate—0.5%
Trace minerals salt—.5%
Vitamin A—300 I.U./lb.
Vitamin D—150 I.U./lb.
2,2,2-trichloroacetamide—80 g./ton of feed Similar animal feeds may be prepared containing an equivalent amount of 3-bromopropionic acid, trichloroacetic acid, 2,2,2-trichloro-N,N-dimethylacetamide, or other compounds within the scope of Formula I.

An example of a suitable premix is as follows:

2,2,2-trichloroacetamide—80 g.
Ground yellow corn—to 5 lb.

This mix may be added to a ton of feed.

We claim:

1. A method for improving the feed utilization in ruminant animals comprising administering to such an animal 0.01–0.25% by weight of the feed the compound of the formula selected from the group consisting of $X_3CCN$ and $X_3CAlk\ CN$ where each X group is hydrogen, alkyl of 1–4 carbon atoms, chloro, bromo, or iodo, at least one of said X groups being chloro, bromo, or iodo;

Alk is an unsubstituted straight or branched chain alkylene group of 1 to 6 carbon atoms.

2. A method according to claim 1, in which the amount administered is sufficient to decrease the production of methane without decreasing the overall fermentation rate.

3. A method according to claim 1, in which the compound is 3-chloropropionitrile.

4. A method according to claim 1, in which the compound is 3-bromopropionitrile.

References Cited

UNITED STATES PATENTS 3,008,869   11/1961   Hopkins et al. _____ 99—2
3,522,353   7/1970    Marco et al. _____ 424—317
3,470,173   9/1969    Alt _____ 424—320

FOREIGN PATENTS 508,738   1/1965   Canada _____ 260—539

OTHER REFERENCES

A. Giacalone et al., Chemical Abstracts, vol. 29, 1935, column 5414 line 67.

F. Bergmann et al., Chemical Abstracts, vol. 35, 1941, column 4351 line 85.

Merck Index, 8th Edition, 1968, p. 1067, "Trichloroacetic Acid."

Hokkai Sankyo Co., Chemical Abstracts, vol. 59, 1963 article 5716h.

NORMAN YUDKOFF, Primary Examiner

C. P. RIBANDO, Assistant Examiner

U.S. Cl. X.R.

99—2 G